Aug. 30, 1955   S. W. NOVAK   2,716,362
CABLE-SPLICING VISE
Filed Nov. 9, 1954   2 Sheets-Sheet 1
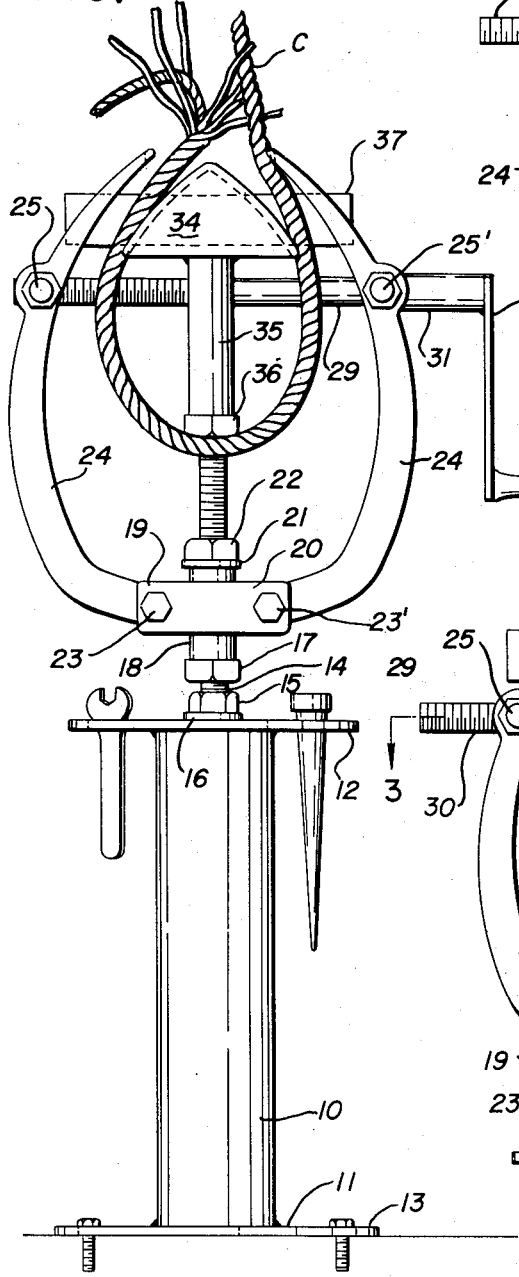
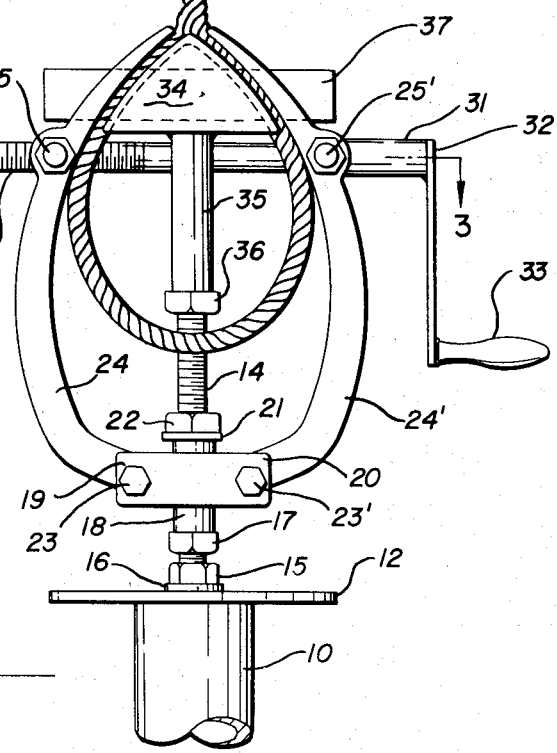
INVENTOR.
STANLEY W. NOVAK
BY
W.B.Harpman
ATTORNEY Aug. 30, 1955   S. W. NOVAK   2,716,362
CABLE-SPLICING VISE
Filed Nov. 9, 1954   2 Sheets-Sheet 2
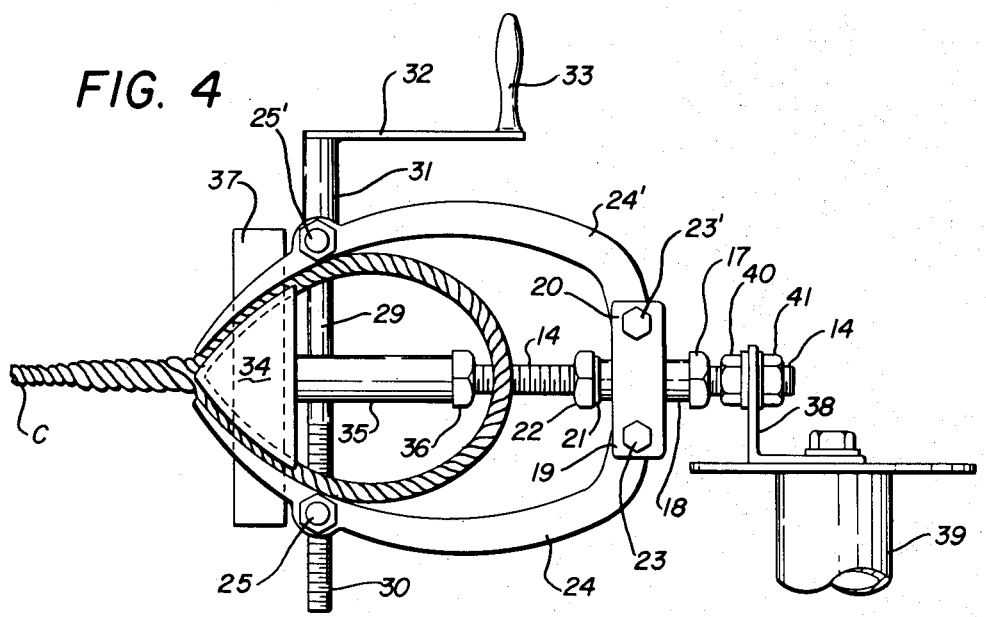
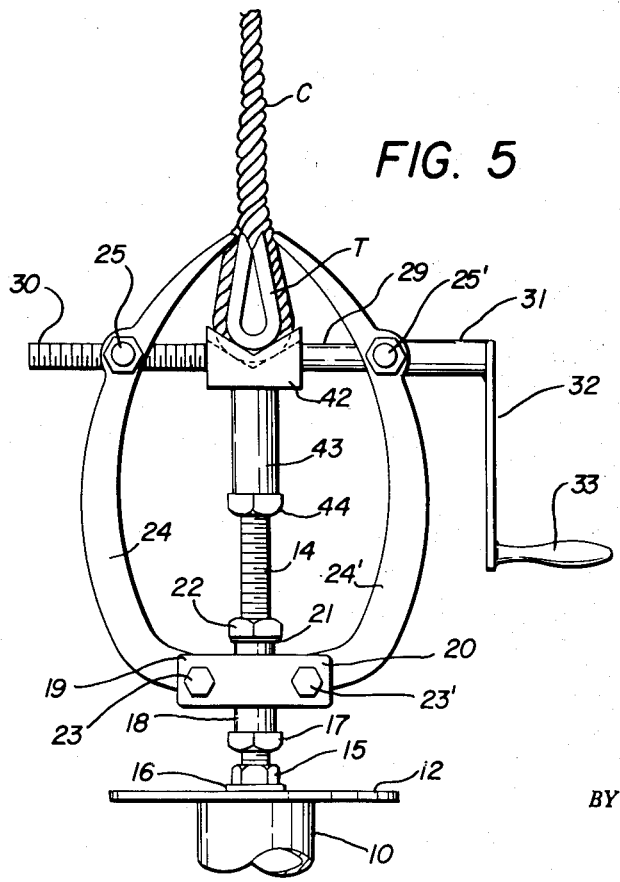
INVENTOR.
STANLEY W. NOVAK
BY
W. B. Harpman
ATTORNEY United States Patent Office 2,716,362
Patented Aug. 30, 1955

2,716,362

CABLE-SPLICING VISE

Stanley W. Novak, Sharon, Pa.

Application November 9, 1954, Serial No. 467,780

8 Claims. (Cl. 81—17.5)

This invention relates to a cable-splicing device and more particularly to a vise particularly useful in positioning and holding parts of a cable as in forming an eyelet at an end thereof or in positioning an end section of a cable about a thimble.

The principal object of the invention is the provision of a cable-splicing vise of simple structural formation capable of easy operation and effective positioning of a cable positioned therein.

A further object of the invention is the provision of a cable-splicing vise which may be used to hold and shape any size cable from one-quarter inch to one and one half inches in diameter to facilitate the splicing thereof.

A still further object of the invention is the provision of a cable-splicing vise that is easy to set up for use and may be used in forming an eye or a loop of any desired size on the end of a cable.

A still further object of the invention is the provision of a cable-splicing vise that can be revolved to loosen the cable strands.

A still further object of the invention is the provision of a cable-splicing vise that is light in weight and inexpensive in construction.

The cable-splicing vise disclosed herein is particularly useful in working with cables which are frequently provided at one or both ends with a thimble around which the cable is wrapped and spliced. Cables are also spliced at their end portions to form eyes or loops of desired diameter and the device disclosed herein is particularly suitable to such formations. Such cables are usually made to relatively accurate specifications as to length and make it necessary that they be spliced in a manner to insure that a specified cable length will be produced within a small limit of tolerance. This is particularly true when cables are spliced around a thimble.

Various types of vises have been provided for the purpose of gripping the thimble and holding the cable in position therearound while the splice is made. In many such devices a plurality of adjusting elements are required which must be set individually to grip the cable and hold the same in a manner to maintain a definite cable length while the splice is being made. Such devices as have heretofore been developed have for the most part been cumbersome and have frequently not properly held the cable either to maintain its length or to facilitate the splicing operation.

It is, therefore, a further object of the invention to provide a cable-splicing vise which includes jaw structures disposed in a manner to be easily accessible and make it possible for a cable to be quickly placed therein and gripped thereby and firmly held so that a predetermined cable length will be insured and a satisfactory splice will result.

It is also important that the operator be able to work easily around the grip cable to produce the splice rapidly and efficiently.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the function and scope of the invention.

The invention is illustrated in the accompanying drawing, wherein:

Figure 1 is a side elevation of the cable-splicing vise with a section of cable loosely positioned in the jaws thereof.

Figure 2 is a side elevation of the cable-splicing vise shown in Figure 1 and showing the cable clamped therein and a splice completed.

Figure 3 is a horizontal section taken on line 3—3 of Figure 2.

Figure 4 is a side elevation of the cable-splicing vise showing the same in horizontal alternate position.

Figure 5 is a side elevation of the cable-splicing vise showing the same with a modified cable-engaging structure facilitating the positioning and maintenance of the cable about a thimble.

By referring to the drawings and Figures 1, 2 and 3 in particular it will be seen that the cable-splicing vise disclosed herein comprises a cylindrical stand 10 having a floor flange 11 at its lower end and a secondary flange 12 at its upper end. The floor flange 11 provides for the reception of fasteners 13 by which the stand 10 may be securely and solidly fastened to a supporting floor.

The secondary flange 12 is formed of a disc having a central opening through which a threaded shaft 14 is positioned. The threaded shaft 14 is secured in a desirable position with respect to the flange 12 by a nut 15 threaded thereon and engaging a washer 16 positioned on the disc forming the flange 12.

An adjustment nut 17 is located upwardly on the threaded shaft 14 which supports a tubular body member 18 having oppositely disposed horizontally extending arms 19 and 20. The upper end of the tubular body member 18 engages a washer 21 which in turn is secured on the threaded shaft 14 by a nut 22. It will be observed that the threaded shaft 14 extends vertically beyond the nut 22.

The oppositely disposed arms 19 and 20 have transversely extending pivot members 23 and 23' by means of which oppositely disposed similarly shaped jaws 24 and 24' are mounted on the body member 18 for motion in a common plane toward and away from one another.

Each of the jaws 24 and 24' is arcuate in side elevation and tapers in thickness toward its upper inner end. The jaws 24 and 24' each have secondary pivot members 25 and 25' positioned therethrough at points thereon spaced inwardly from their uppermost ends, as best shown in Figure 3 of the drawings.

By referring now to Figure 3 of the drawings it will be seen that the pivot members 25 and 25' comprise blocks 26 and 26' having rod-like threaded extensions formed integrally therewith and engaged in openings in the jaws 24 and 24' and defining the secondary pivot members 25 and 25'. The blocks 26 and 26' are provided with transverse openings at right angles to the pivot members 25 and 25', the opening in the block 26 being threaded as at 27 and the opening in the block 26' being unthreaded as at 28. A shaft 29 is positioned through the openings 27 and 28 and a threaded portion 30 thereof is threadably engaged in the threaded opening 27 in the block 26 while an unthreaded portion of the shaft 29 is reciprocally mounted in the opening 28 in the block 26'.

A sleeve 31 is positioned about one end of the shaft 29 and abuts the block 26' and a crank arm 32 is secured to the outer end of the shaft 29. The crank arm 32 has a crank handle 33 formed thereon, as best seen in Figures 1 and 2 of the drawings, and it will be observed that the shaft 29 can be easily rotated by the crank arm 32 and handle 33 and that such rotation moves the jaws 24 and 24' toward or away from one another.

Still referring to Figure 1 of the drawings it will be seen that the upper end of the threaded shaft 14 adjustably receives a throat block 34 by means of a tubular extension 35 which telescopically engages the threaded shaft 14 and is positioned with respect thereto by an adjustment nut 36.

The throat block 34, which includes a triangular body member, two of the edges of which are transversely arcuate so as to define concave channels therein, also has a transversely extending guide member 37 which comprises an elongated body member, the ends of which extend outwardly beyond the triangular portion of the throat block 34 and slidably engage the back sides of the jaws 24 and 24'. The guide member 37 holds the throat block 34 in fixed relation with respect to the jaws 24 and 24' and on a common transverse plane so that a cable C positioned between the paws 24 and 24' and around the opposite sides of the triangular portion of the throat block 34 will be caused to define an eye, such as best shown in Figure 2 of the drawings, at such time as the jaws 24 and 24' are moved into clamping engagement against the cable C.

In Figure 1 of the drawings the end of the cable C has been unwound and positioned adjacent the portion of the cable in which it is to be spliced.

In Figure 2 of the drawings the splice has been completed, the cable-splicing vise having been rotated after having been clamped on the cable C to open the cable intermediate its ends and permit the unwound end portions to be properly spliced thereinto.

Still referring to Figure 2 of the drawings it will be seen that the throat block 34 and the arcuate formation of the jaws 24 and 24' continuously engage the portions of cable therebetween thereby holding the same in a suitable manner. It will also be seen that the sides of the eye being formed may be varied at will. For example, a considerably larger eye than that illustrated in Figure 2 of the drawings may be formed by permitting the cable to extend downwardly and out of the area of the jaws 24 and 24' to whatever size is desired.

It will occur to those skilled in the art that the vise disclosed herein may be used in horizontal position and in Figure 4 of the drawings the cable-splicing vise is so illustrated, it being observed that an L-shaped bracket 38 is bolted to a flanged stand 39 and the vertical portion of the L-shaped bracket 38 is provided with an opening so that the threaded shaft 14 heretofore referred to can be positioned therethrough and secured by a pair of oppositely disposed nuts 40 and 41.

It will also occur to those skilled in the art that in order to splice the cable of a thimble, a different form of throat block is required than that heretofore described and indicated by the numeral 34. In Figure 5 of the drawings the cable-splicing vise is shown with an alternate throat block in position thereon, the throat block 34 having been removed by sliding it vertically off of the upper end of the shaft 14 and a thimble-engaging block 42 substituted.

The thimble-engaging block 42 comprises a body member having the upper surface thereof inclined inwardly toward a center point and grooved transversely so that the lower end of an eye of a cable will be received and retained therein. The thimble-engaging block 42 has a tubular depending member 43 which is telescopically engaged on the threaded shaft 14 and held in desired position with respect to the ends of the jaws 24 and 24' by a nut 44. A thimble T is shown positioned in an eye or loop formed in the cable C, the upper inner ends of the jaws 24 and 25' being engaged upon the opposite sides of the cable and securely position the same about the thimble T while the splice is made immediately thereabove.

It will be observed that the upper innermost ends of the jaws 24 and 24' are transversely arcuate to facilitate their registry against the cable C and so as to retain the cable C in position against the ends of the jaws 24 and 24' at all times, and that the jaws 24 and 24' move toward and away from one another at a uniform rate due to the arrangement of the threaded and unthreaded portion blocks 26 and 26' and which comprise part of the pivot members 25 and 25' engaging the jaws 24 and 24'.

It will also be seen that apertures are preferably provided in the flange 12 so that the necessary tools, and particularly a marlinspike, can be conveniently positioned therein.

It will thus be seen that the several objects of the invention have been met by the cable-splicing vise disclosed herein.

Having thus described my invention, what I claim is:

1. A cable-splicing vise for forming eyes in the ends of cables comprising a pair of spaced pivoted jaws, a pivot for each jaw, said pivots being spaced from each other and adjustably positioned on a vertical support member, apertured pivot blocks engaging said jaws in oppositely disposed relation, a shaft engaging said apertured pivot blocks, one end of said shaft being threaded and the aperture in one of said pivot blocks being threaded for registry therewith, and means for rotating said shaft to move said jaws toward and away from each other, a throat-block member adjustably mounted on said vertical support and positioned intermediate said jaws, and guide means on said throat-block member slidably engaging said jaws for maintaining said throat-block member in fixed position with respect thereto.

2. The cable-splicing vise as set forth in claim 1 and wherein the vertical support member comprises a tubular member adjustably positioned on a threaded shaft, and wherein the throat-block member is positioned on the upper end of said threaded shaft.

3. The cable-splicing vise as set forth in claim 1 and wherein the ends of the jaws are transversely arcuate and the outer surfaces of the throat-block member are transversely concave to facilitate holding a cable therebetween.

4. A cable-splicing vise comprising a stand supporting a threaded shaft, a tubular body member slidably disposed in said threaded shaft, oppositely disposed arms on said tubular body member carrying pivots and oppositely disposed curved jaws secured to said pivots, apertured blocks having threaded rod-like extensions engaging openings in said jaws intermediate their ends and a shaft positioned through said apertured blocks, a portion of said shaft being threaded and threadably engaged in one of said blocks and crank means on said shaft for revolving the same to move said jaws toward and away from each other, a throat-block member comprising a triangular member having a tubular depending portion engaged on the upper end of said threaded shaft, an elongated guide member secured to said triangular threaded member in offset relation thereto and slidably engaging said jaws, and means for adjustably positioning said throat-block member and said tubular member on said threaded shaft.

5. The cable-splicing vise as set forth in claim 4 and wherein the threaded shaft is mounted on the stand by telescopically engaging the same and a secondary adjustment nut is positioned on said threaded shaft and engages said stand.

6. The cable-splicing vise set forth in claim 4 and wherein an L-shaped bracket is attached to said stand and includes a vertical portion having a horizontal opening in which said threaded shaft is secured by oppositely disposed nut and bolt assemblies.

7. A cable-splicing vise for positioning a cable about a thimble, said vise comprising a threaded shaft and means for supporting said threaded shaft, a tubular member adjustably positioned on said threaded shaft intermediate its ends, oppositely disposed arms on said tubular member and a pair of oppositely disposed curved jaws pivoted to said oppositely disposed arms, apertured blocks having rod-like extensions engaging openings in said jaws intermediate their ends, a shaft positioned through said apertured blocks, a portion of the shaft being threaded and threadably engaged in one of said blocks, a sleeve on the other end of said shaft engaging the other of said blocks, and a handle on said shaft adjacent the other end of said sleeve, a cable-engaging member adjustably positioned on said threaded shaft intermediate said jaws, the upper surface of said cable-engaging member having oppositely disposed inwardly inclined surfaces, said cable-engaging member disposed adjacent said shaft so as to be secured against rotation thereby.

8. The cable-splicing vise as set forth in claim 7 and wherein the upper surfaces of the cable-engaging member are grooved longitudinally and the ends of the jaws are concave to facilitate engagement against the outer surfaces of a cable positioned about a thimble and disposed between said jaws on said cable-engaging member.

References Cited in the file of this patent

UNITED STATES PATENTS

| | | |
|---|---|---|
| 2,323,774 | Jacoel | July 6, 1943 |
| 2,384,992 | Garlinghouse | Sept. 18, 1945 |
| 2,471,269 | Gaulke | May 24, 1949 |